(12) United States Patent
Huang

(10) Patent No.: US 8,014,658 B2
(45) Date of Patent: Sep. 6, 2011

(54) IMAGE STABILIZER AND CAMERA MODULE HAVING SAME

(75) Inventor: Yu-Chien Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/641,571

(22) Filed: Dec. 18, 2009

(65) Prior Publication Data
US 2010/0260492 A1 Oct. 14, 2010

(30) Foreign Application Priority Data

Apr. 10, 2009 (CN) .......................... 2009 1 0301459

(51) Int. Cl.
*G03B 17/00* (2006.01)
*G02B 27/64* (2006.01)
(52) U.S. Cl. ......................................... 396/55; 359/554
(58) Field of Classification Search .................... 396/55; 348/208.99, 208.4, 208.7, 208.11, 373–374; 359/554, 557
See application file for complete search history.

(56) References Cited

U.S. PATENT DOCUMENTS

2007/0236577 A1* 10/2007 Ke et al. .................... 348/208.99
2009/0303594 A1* 12/2009 Lim et al. ...................... 359/554

* cited by examiner

*Primary Examiner* — W. B. Perkey
*Assistant Examiner* — Minh Phan
(74) *Attorney, Agent, or Firm* — Altis Law Group, Inc.

(57) ABSTRACT

An exemplary image stabilizer includes an outer housing, an inner housing, an upper cover and a driving assembly. The inner housing is moveably received in the outer housing. The upper cover is fixedly mounted on the inner housing and moveably supported by the outer housing. The driving assembly includes a first magnetic member and a second magnetic member. The first magnetic member is positioned on the inner housing. The second magnetic member is positioned on the outer housing. The driving assembly is configured for driving the inner housing and the upper cover to move relative to the outer housing in a plane substantially perpendicular to a central axis of the outer housing through interaction between the first magnetic member and the second magnetic member.

17 Claims, 5 Drawing Sheets

IMAGE STABILIZER AND CAMERA MODULE HAVING SAME

BACKGROUND

1. Technical Field

The present disclosure relates to image stabilizers and camera modules having such image stabilizers.

2. Description of Related Art

A camera module typically includes an image sensor for converting light into electrical signals. The electrical signals can be processed to form images. If the camera module experiences vibration or movement during image capturing, the image sensor is likely to form blurred images.

Therefore, there is a need for an image stabilizer and a camera module having same, in which the above problems are eliminated or at least alleviated.

DETAILED DESCRIPTION

Figure 1:
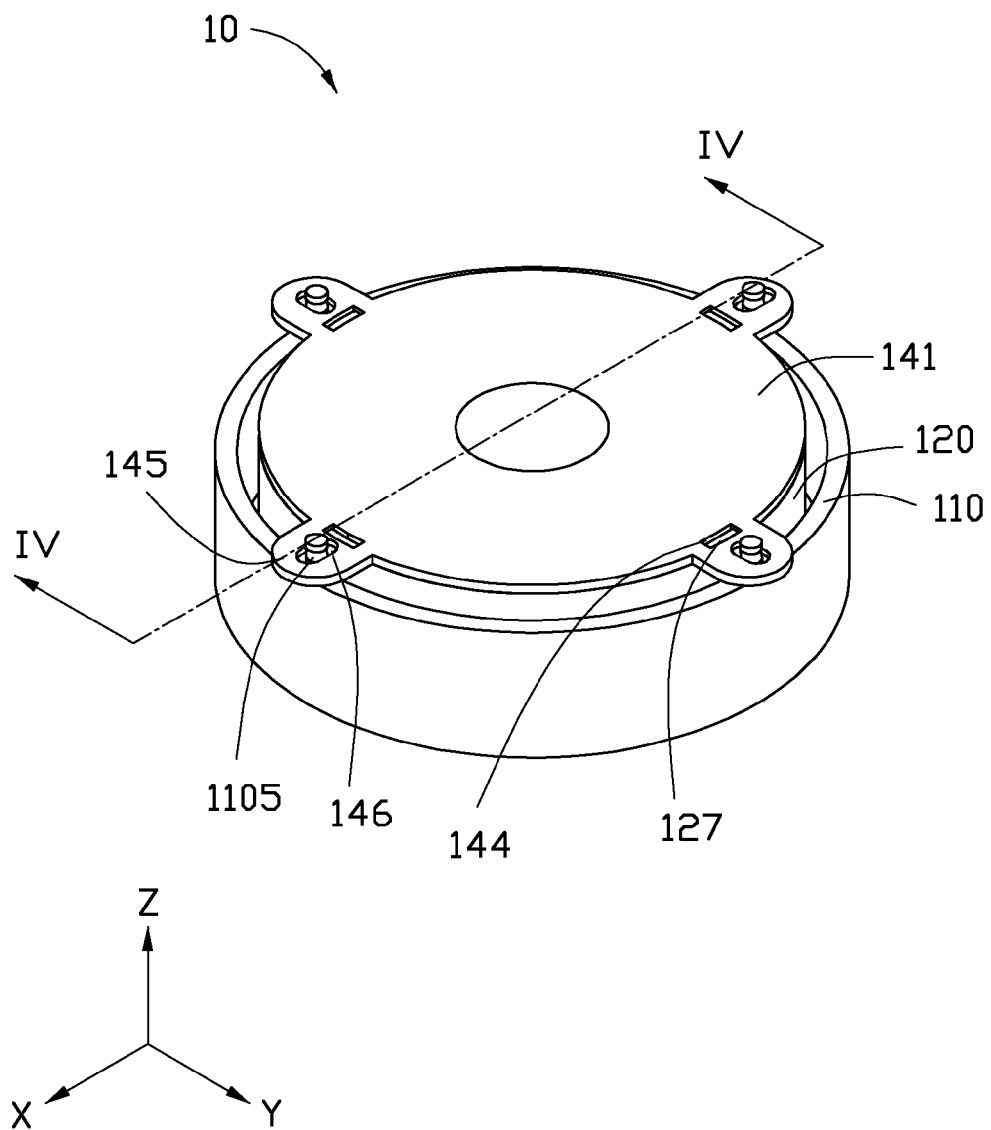
FIG. 1 is an isometric and schematic view of an image stabilizer, according to an exemplary embodiment.

Referring to FIGS. 1-4, an image stabilizer 10, according to an exemplary embodiment, includes an outer housing 11, an inner housing 12, a driving assembly 13, an upper cover 14, and a supporting member 15.

The outer housing 11 includes a first receiving sleeve 110, and a second receiving sleeve 112 received in the first receiving sleeve 110. The first receiving sleeve 110 is aligned with the second receiving sleeve 112.

The first receiving sleeve 110 includes an outer cylindrical side wall 1100 and an outer circular bottom wall 1101. The outer cylindrical side wall 1100 substantially extends perpendicular to the outer circular bottom wall 1101 to cooperatively define a first receiving cavity 1102. The outer cylindrical side wall 1100 includes a first upper end surface 1103 and a first lower end surface 1104 at opposite sides of the outer cylindrical side wall 1100 correspondingly. Four first guiding members 1105 extend perpendicular to the first upper end surface 1103 along a central axis L of the outer cylindrical side wall 1100. The four first guiding members 1105 are substantially equidistant from each other around the central axis L of the outer cylindrical side wall 1100. In this embodiment, each first guiding member 1105 is substantially a cylinder and defines an annular groove 1106. A coordinate system is defined as follow: X axis is defined parallel to a first line passing through centers of two first guiding members 1105 on opposite sides of the outer cylindrical side wall 1100. Y axis is defined parallel to a second line passing through centers of other two first guiding members 1105 on other opposite sides of the outer cylindrical side wall 1100. The X axis is perpendicular to the Y axis. Z axis is defined perpendicular to the X and Y axes. The central axis L of the outer cylindrical side wall 1100 is substantially parallel to the Z axis.

The outer circular bottom wall 1101 includes a first surface 1107 and a second surface 1108 at opposite sides thereof. The outer circular bottom wall 1101 defines a first through hole 1109 through the first surface 1107 and the second surface 1108 at a center of the outer circular bottom wall 1101. Four rectangular recesses 1110 are defined in the first surface 1107 spatially corresponding to the guiding members 1105.

The second receiving sleeve 112 is positioned on the first surface 1107 of the outer circular bottom wall 1101 at the first through hole 1109. The second receiving sleeve 112 includes a supporting cylindrical side wall 1120. A second receiving cavity 1121 is defined in the supporting cylindrical side wall 1120. The second receiving cavity 1121 is aligned and in communication with the first through hole 1109. The supporting cylindrical side wall 1120 includes a second upper end surface 1122, a second lower end surface 1123, and a stepped outer surface 1125. The second lower end surface 1123 is coplanar with the first surface 1107 of the outer circular bottom wall 1101. The stepped outer surface 1125 connects the second upper end surface 1122 and the second lower end surface 1123. A supporting surface 1127 is formed on the stepped outer surface 1125 accordingly. The supporting surface 1127 is substantially parallel to the second upper end surface 1122.

The inner housing 12 is received in the first receiving cavity 1102 and sleeves the second receiving sleeve 112 therein. The inner housing 12 includes an inner cylindrical side wall 120 and an inner circular bottom wall 121. The inner cylindrical side wall 120 extends substantially perpendicular to the inner circular bottom wall 121 away from the outer circular bottom wall 1101. The inner cylindrical side wall 120 and the inner circular bottom wall 121 cooperatively define a third receiving cavity 122. The inner cylindrical side wall 120 includes a third upper end surface 123 and a third lower end surface 124 at opposite sides thereof. Four protrusions 127 extend perpendicular to the third upper end surface 123 along the central axis L of the outer cylindrical side wall 1100. The four protrusions 127 spatially correspond to the four guiding members 1105.

The inner circular bottom wall 121 includes a second through hole 128 defined at a center thereof. The second through hole 128 is aligned with the first through hole 1109. The second through hole 128 allows the second receiving sleeve 112 to pass through the inner circular bottom wall 121. A diameter of the second through hole 128 is larger than an outer diameter of the supporting cylindrical side wall 1120. Four protruding elongated blocks 129 are formed on a bottom surface 121a of the inner circular bottom wall 121 (see FIG. 3). Each protruding elongated block 129 is corresponding to one of the rectangular recesses 1110.

The driving assembly 13 is arranged between the outer circular bottom wall 1101 and the inner circular bottom wall 121 and is configured for driving the inner housing 12 and the upper cover 14 to move relative to the outer housing 11 in a plane perpendicular to a central axis of the outer housing 11, i.e., the central axis L of the cylindrical side wall 1100. The plane is substantially parallel to the X-Y plane of the coordinate system. In this embodiment, the driving assembly 13 includes a first magnetic member 131 and a second magnetic member 132.

The first magnetic member 131 includes electromagnets positioned on the inner housing 12 and the second magnetic member 132 includes permanent magnets positioned on the outer housing 11 in this embodiment. The first magnetic member 131 may be electrically connected to an outer controller (not shown) and includes a first coil 1310, a second coil 1311, a third coil 1312, and a fourth coil 1313. Each coil is substantially rectangular and wraps around the corresponding elongated block 129 to fix on the bottom surface 121a of the inner circular bottom wall 121 (see FIG. 4). The coils 1310, 1311, 1312, and 1313 move together with the inner housing 12. Longitudinal directions of the first coil 1310 and the third coil 1312 are along the X axis. Longitudinal directions of the second coil 1311 and the fourth coil 1313 are along the Y axis.

The second magnetic member 132 is made from a permanent-magnet material, such as neodymium iron boron alloy, samarium cobalt alloy, or alnico. The second magnetic member 132 includes a first permanent magnet 1320, a second permanent magnet 1321, a third permanent magnet 1322 and a fourth permanent magnet 1323. The first permanent magnet 1320, the second permanent magnet 1321, the third permanent magnet 1322 and the fourth permanent magnet 1323 are rectangular. Each permanent magnet is fixedly received in the corresponding rectangular recess 1110. The first permanent magnet 1320 faces the first coil 1310. The second permanent magnet 1321 faces the second coil 1311. The third permanent magnet 1322 faces the third coil 1312. The fourth permanent magnet 1323 faces the fourth coil 1313.

It is to be understood that in other alternative embodiments, the first magnetic member 131 may be permanent magnets instead of electromagnets, and the second magnetic member 132 may include electromagnets instead of permanent magnets. The outer circular bottom wall 1101 may include elongated blocks on the first surface 1107 instead of recesses. The inner circular bottom wall 121 may define recesses instead of elongated blocks on the bottom surface 121a thereof.

The upper cover 14 is configured for receiving optical components. The upper cover 14 is fixedly mounted on the inner housing 12. The upper cover 14 includes a cover cylindrical side wall 140 and a cover circular bottom wall 141. An outer diameter of the cover cylindrical side wall 140 is smaller than an inner diameter of the supporting cylindrical side wall 1120. A fourth through hole 141a is defined in the cover circular bottom wall 141 and is aligned with the first through hole 1109. An outer diameter of the cover circular bottom wall 141 is substantially same as that of the inner cylindrical side wall 120. Four engaging slots 144 are defined in the cover circular bottom wall 141 corresponding to the four protrusions 127. Each engaging slot 144 is shaped and sized for fixedly receiving the corresponding protrusion 127.

The cover cylindrical side wall 140 extends from the cover circular bottom wall 141 toward the outer circular bottom wall 1101 corresponding to the first through hole 1109. A fourth receiving cavity 1400 is defined in the cover cylindrical side wall 140 (see FIG. 3). The fourth receiving cavity 1400 is aligned and in communication with the fourth through hole 141a. The cover cylindrical side wall 140 is received in the second receiving cavity 1121. Thus, the fourth through hole 141a is aligned with the first through hole 1109.

The upper cover 14 further includes four second guiding members 145. The four second guiding members 145 extend radially from a circumference of the cover circular bottom wall 141. Each second guiding member 145 is adjacent to the respective engaging slot 144. A sliding slot 146 is defined radially in each second guiding member 145. Each first guiding member 1105 extends through the corresponding second guiding member 145 with the annular groove 1106 coupled to the respective sliding slot 146. The second guiding members 145 are guided by the sliding slot 146 and the annular groove 1106 to slide relative to the first guiding member 1105 correspondingly. Thus, the inner housing 12 together with the upper cover 14 can move relative to the outer housing 11 in the plane perpendicular to the central axis of the outer housing 11.

The supporting member 15 is received in the third receiving cavity 122 and is covered by the upper cover 14. The supporting member 15 is configured for moveably supporting the upper cover 14 on the outer housing 11.

In this embodiment, the supporting member 15 includes a supporting ring 150 and a plurality of rolling balls 151. The supporting ring 150 defines a third through hole 152 and a plurality of supporting holes 153. The third through hole 152 is defined in a center of the supporting ring 150. The supporting holes 153 are equidistant from each other around the third through hole 152. The supporting ring 150 fixedly sleeves the second receiving sleeve 112 and is supported by the supporting surface 1127 of the second receiving sleeve 112 (see FIG. 4). Thus, the supporting ring 150 is fixedly mounted on the outer housing 11. The supporting ring 150 is substantially perpendicular to the supporting cylindrical side wall 1120.

The rolling ball 151 is partially and rotatably received in a corresponding supporting hole 153. A material of the rolling ball 151 is ceramics or stainless steel. Each rolling ball 151 rotatably contacts the cover circular bottom wall 141 and the inner circular bottom wall 121. Therefore, the upper cover 14 and the inner housing 12 are moveably supported on the outer housing 11 by the supporting member 15.

For example, if the first coil 1310 and the third coil 1312 of the magnetic member 131 are activated, e.g., electrified with clockwise current by the outer controller, the first coil 1310 and the third coil 1312 are driven by Lorentz force (a driving force) generated by magnetic field of the first permanent magnet 1320 and the third permanent magnet 1322. Accordingly, the first coil 1310 and the third coil 1312 move along the Y axis. The inner housing 12 together with the upper cover 14 moves along the Y axis due to the movement of the first coil 1310 and the third coil 1312. The movement of the inner housing 12 and the upper cover 14 is guided by the two second guide members 145 and the two first guiding members 1105 along the Y axis. Since the rolling balls 151 rotatably contacts the cover circular bottom wall 141 and the inner circular bottom wall 121, jitters due to the movement of the inner housing 12 and the upper cover 14 can be minimized and may even be non-existent. The inner housing 12 and the upper cover 14 can move smoothly with support of the supporting member 15.

It can be understood that, in other alternative embodiments, number of the first and second guiding members 1105, 145 may be different from four as long as number of the first guiding member 1105 is equal to that of the second guiding member 145. Number of the engaging slot 144 and protrusion 127 may be different from four as along as number of the engaging slot 144 is equal to that of the protrusion 127.

Figure 2:
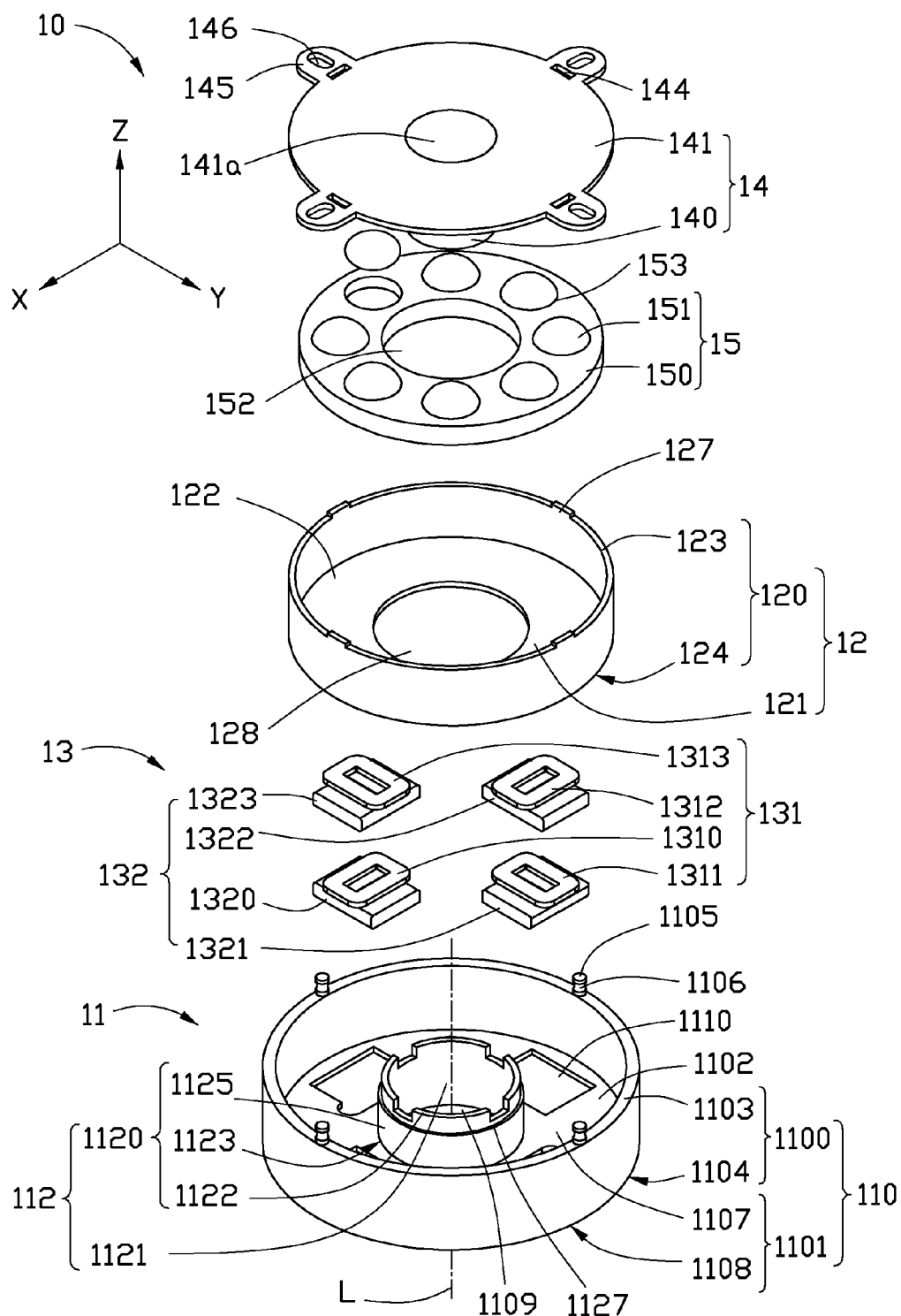
FIG. 2 is an exploded view of the image stabilizer of FIG. 1.
Figure 3:
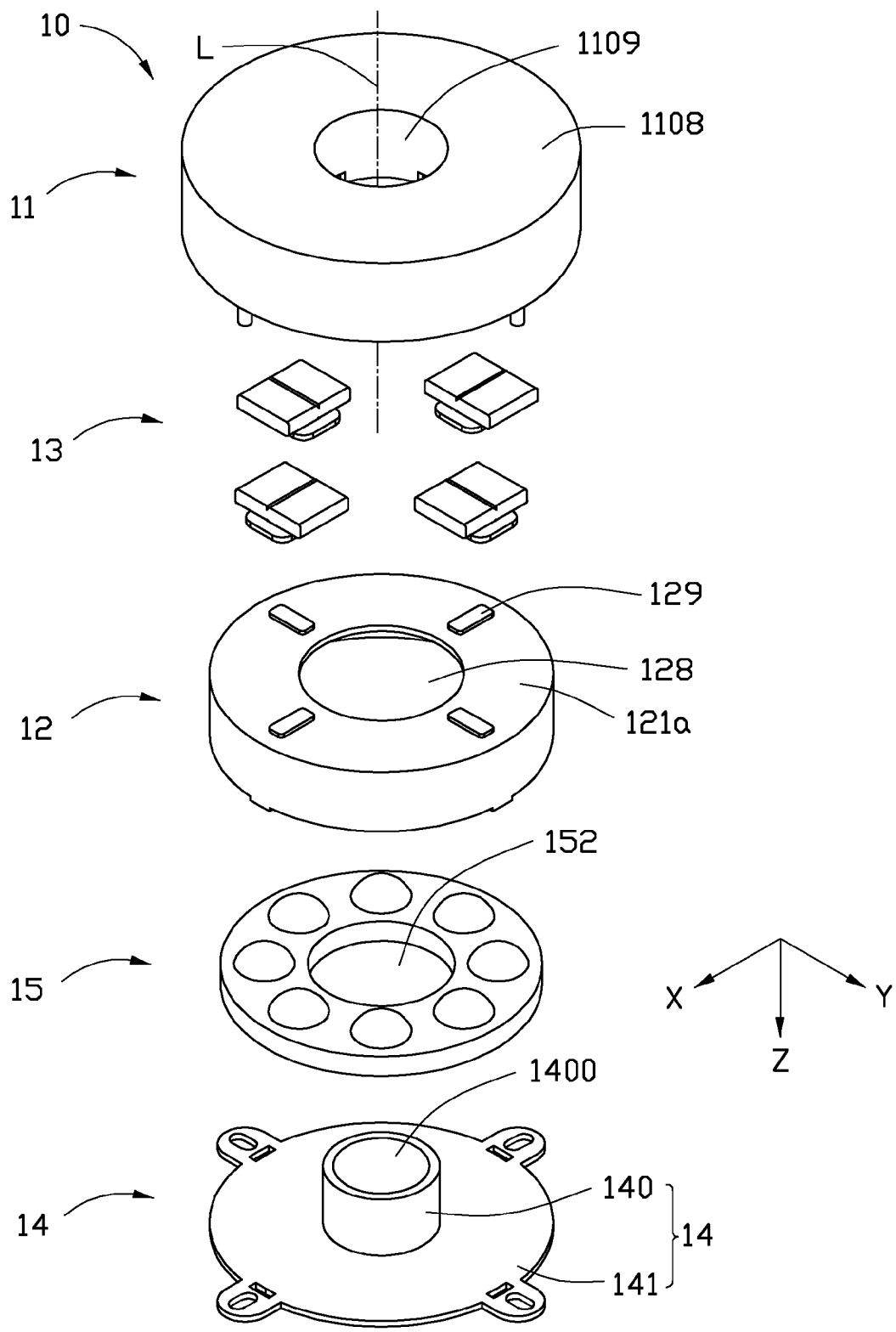
FIG. 3 is similar to FIG. 2, but viewing the image stabilizer from another angle.
Figure 4:
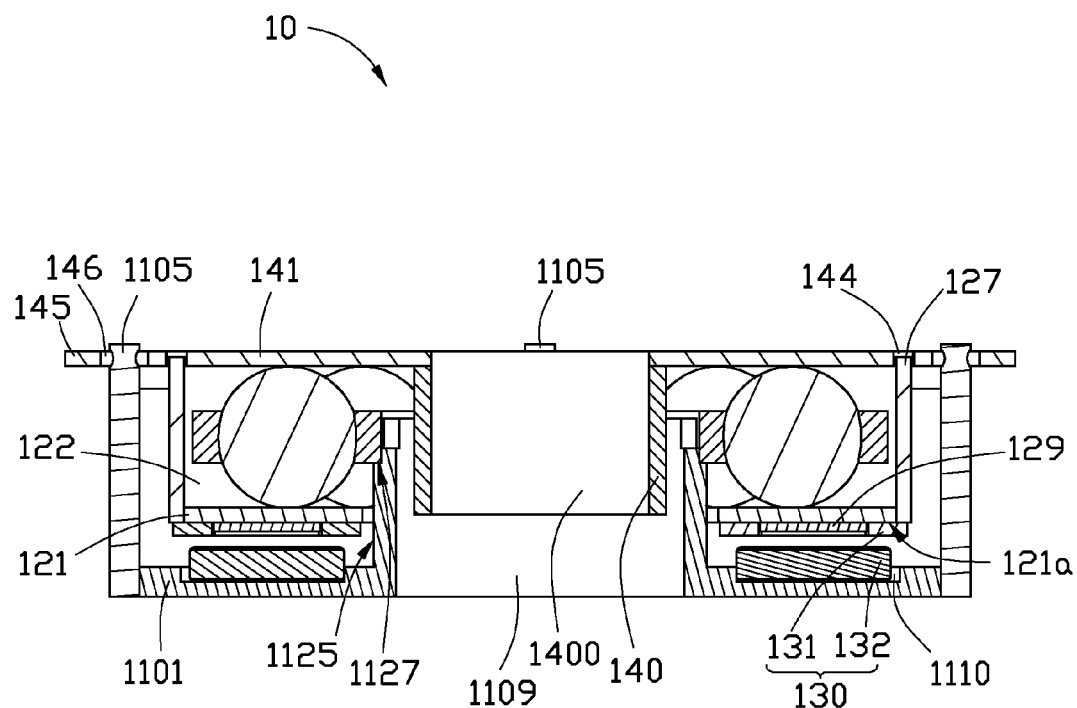
FIG. 4 is a sectional view taken along line IV-IV of the image stabilizer of FIG. 1.
Figure 5:
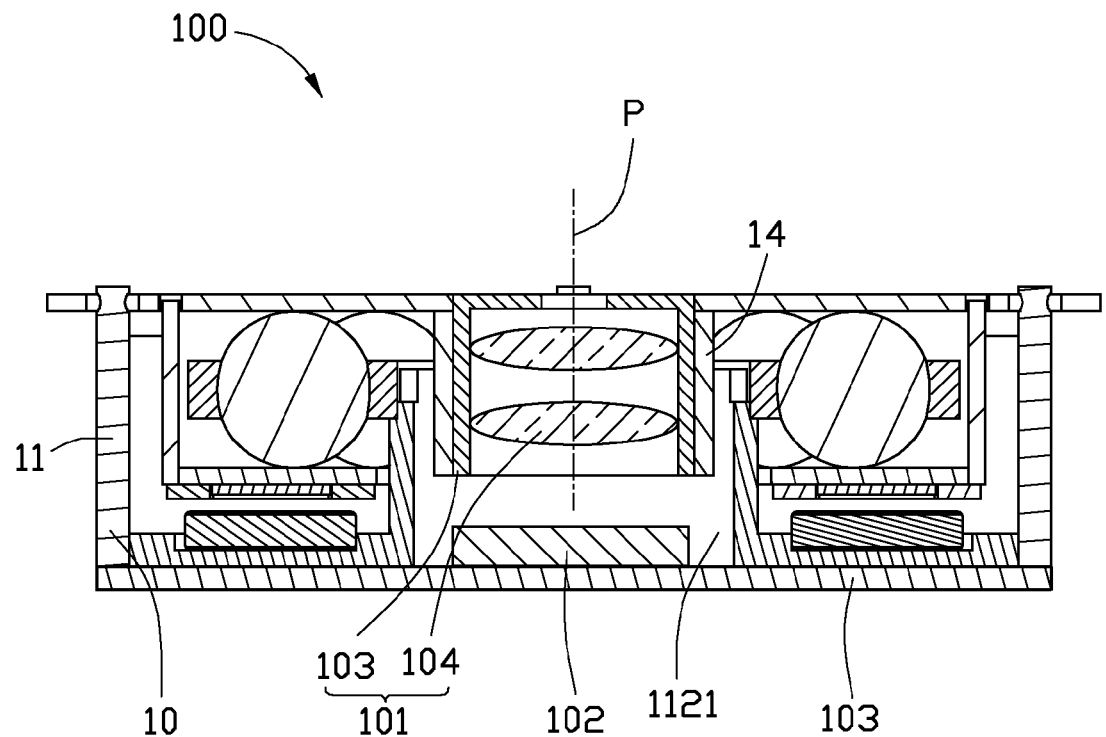
FIG. 5 is a sectional view of a camera module, according to another exemplary embodiment.

Referring to FIG. 5 together with FIGS. 2 and 4, a camera module 100, according to another exemplary embodiment, includes the image stabilizer 10, a lens module 101, an image sensor 102 and a fixing board 103.

The lens module 101 is fixedly received in the fourth receiving cavity 1400 of the upper cover 14. The lens module 101 moves together with the upper cover 14. The lens module 101 includes a lens barrel 103 and two lenses 104 received in the lens barrel 103.

The image sensor 102 is positioned on the fixing board 103 at the image side of the lens module 101. The image sensor 102 is aligned with an optical axis P of the lens module 101. The optical axis P of the lens module 101 coincides with the central axis of the outer housing 11.

The fixing board 103 is fixedly attached to the outer housing 11. The image sensor 102 is received in the second receiving cavity 1121 of the outer housing 11. Therefore, when in use, the lens module 101 is moved by the upper cover 14 relative to the image sensor 102 in the plane perpendicular to the central axis of the outer housing 11 to compensate vibration or movement of the camera module 100 during image capturing.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image stabilizer, comprising:
   an outer housing comprising a first receiving sleeve having an outer circular bottom wall, an outer cylindrical side wall extending substantially perpendicularly from the outer circular bottom wall, and a plurality of first guiding members extending perpendicularly from an upper end surface of the outer cylindrical side wall along a central axis of the outer housing;
   an inner housing moveably received in the outer housing;
   an upper cover fixedly mounted on the inner housing and moveably supported by the outer housing, the upper cover comprising a cover cylindrical side wall, a cover circular bottom wall and a plurality of second guiding members corresponding to the first guiding members, the cover cylindrical side wall extending perpendicularly from the cover circular bottom wall toward the outer circular bottom wall, the second guiding members extending radially from a circumference of the cover circular bottom wall, each of the second guiding members slidably coupled to a corresponding first guiding member, the first guiding members configured for guiding the movement of the inner housing and the upper cover; and
   a driving assembly comprising a first magnetic member and a second magnetic member, the first magnetic member positioned on the inner housing, the second magnetic member positioned on the outer housing, the driving assembly configured for driving the inner housing and the upper cover to move relative to the outer housing in a plane substantially perpendicular to the central axis of the outer housing through interaction between the first magnetic member and the second magnetic member.

2. The image stabilizer of claim 1, wherein the outer housing further comprises a second receiving sleeve received in the first receiving sleeve, the inner housing received in the first receiving sleeve and sleeving the second receiving sleeve therein.

3. The image stabilizer of claim 2, wherein the second receiving sleeve comprises a supporting cylindrical side wall having a second upper end surface, a second lower end surface, and a stepped outer surface, the second lower end surface is coplanar with the outer circular bottom wall, and the stepped outer surface connects the second upper end surface to the second lower end surface.

4. The image stabilizer of claim 3, wherein a supporting surface is formed on the stepped outer surface, and the supporting surface is substantially parallel to the second upper end surface.

5. The image stabilizer of claim 1, wherein each of the second guiding members has a sliding slot defined therein, and each of the first guiding members has an annular groove defined therearound, the first guiding members extending through the corresponding second guiding members with the annular grooves coupled to the respective sliding slots, each of the second guiding members being slidable relative to the corresponding first guiding member.

6. The image stabilizer of claim 1, wherein the cover circular bottom wall has a plurality of engaging slots adjacent to the respective second guiding members.

7. The image stabilizer of claim 6, wherein the inner housing comprises an inner cylindrical side wall, an inner circular bottom wall, and a plurality of protrusions, the inner cylindrical side wall extending perpendicularly from the inner circular bottom wall away from the outer circular bottom wall, the protrusions extending perpendicularly from an upper end surface of the inner cylindrical side wall along the central axis of the inner housing, each of the protrusions fixedly received in a corresponding engaging slot to fixedly mount the inner housing to the upper cover.

8. The image stabilizer of claim 1, wherein the outer circular bottom wall has a plurality of recesses defined therein, and the second magnetic member is received in the recesses.

9. The image stabilizer of claim 8, wherein the second magnetic member comprises a plurality of permanent magnets positioned on the outer housing, each of the permanent magnets received in a corresponding recess.

10. The image stabilizer of claim 9, wherein the first magnetic member comprises a plurality of electromagnets positioned on the inner housing, each of the permanent magnets facing a corresponding electromagnet.

11. The image stabilizer of claim 1, further comprising a supporting member received in the inner housing and covered by the upper cover, the supporting member configured for moveably supporting the upper cover on the inner housing.

12. The image stabilizer of claim 1, wherein the first magnetic member comprises a plurality of permanent magnets positioned on the inner housing and the second magnetic member comprises a plurality of electromagnets positioned on the outer housing, each of the permanent magnets facing a corresponding electromagnet.

13. A camera module, comprising:
   an image stabilizer comprising:
      an outer housing comprising a first receiving sleeve having an outer circular bottom wall, an outer cylindrical side wall extending substantially perpendicularly from the outer circular bottom wall, and a plurality of first guiding members extending perpendicularly from an upper end surface of the outer cylindrical side wall along a central axis of the outer housing;
      an inner housing moveably received in the outer housing;
      an upper cover fixedly mounted on the inner housing and moveably supported by the outer housing, the upper cover comprising a cover cylindrical side wall, a cover circular bottom wall and a plurality of second guiding members corresponding to the first guiding members, the cover cylindrical side wall extending perpendicularly from the cover circular bottom wall toward the outer circular bottom wall, the second guiding members extending radially from a circumference of the cover circular bottom wall, each of the second guiding members slidably coupled to a corresponding first guiding member, the first guiding members configured for guiding the movement of the inner housing and the upper cover; and
      a driving assembly comprising a first magnetic member and a second magnetic member, the first magnetic member positioned on the inner housing, the second magnetic member positioned on the outer housing, the driving assembly configured for driving the inner housing and the upper cover to move relative to the outer housing in a plane substantially perpendicular to the central axis of the outer housing through interaction between the first magnetic member and the second magnetic member;
a lens module received in the upper cover;
a fixing board fixedly attached to the outer housing; and
an image sensor positioned on the fixing board and received in the outer housing.

14. The camera module of claim 13, wherein the central axis of the outer housing coincides with an optical axis of the lens module.

15. The camera module of claim 13, wherein each of the second guiding members has a sliding slot defined therein, and each of the first guiding members has an annular groove defined therearound, the first guiding members extending through the corresponding second guiding members with the annular grooves coupled to the respective sliding slots, each of the second guiding members being slidable relative to the corresponding first guiding member.

16. The camera module of claim 13, wherein the cover circular bottom wall has a plurality of engaging slots adjacent to the respective second guiding members.

17. The camera module of claim 16, wherein the inner housing comprises an inner cylindrical side wall, an inner circular bottom wall, and a plurality of protrusions, the inner cylindrical side wall extending perpendicularly from the inner circular bottom wall away from the outer circular bottom wall, the protrusions extending perpendicularly from an upper end surface of the inner cylindrical side wall along the central axis of the inner housing, each of the protrusions fixedly received in a corresponding engaging slot to fixedly mount the inner housing to the upper cover.

* * * * *